Jan. 25, 1927.
S. KUNO
HEATING STEERING WHEEL
Filed May 17, 1926
1,615,635
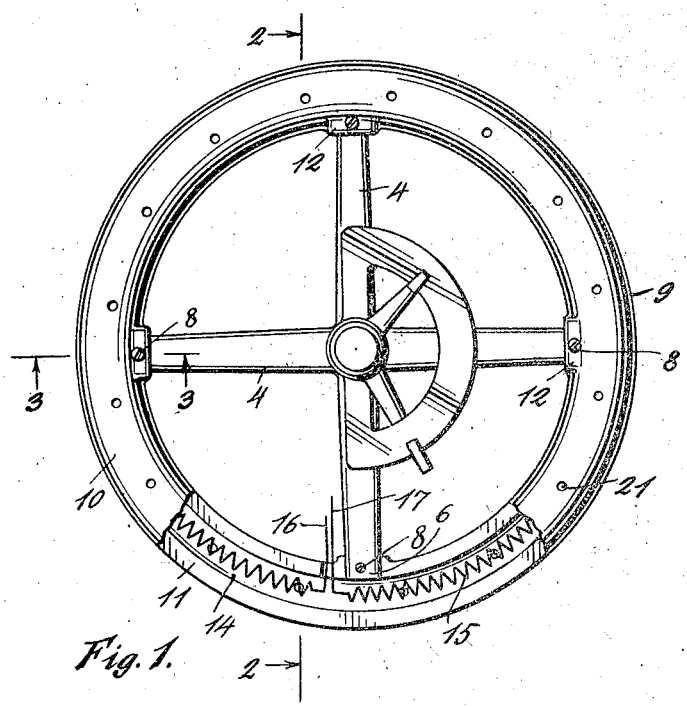
Fig. 1.
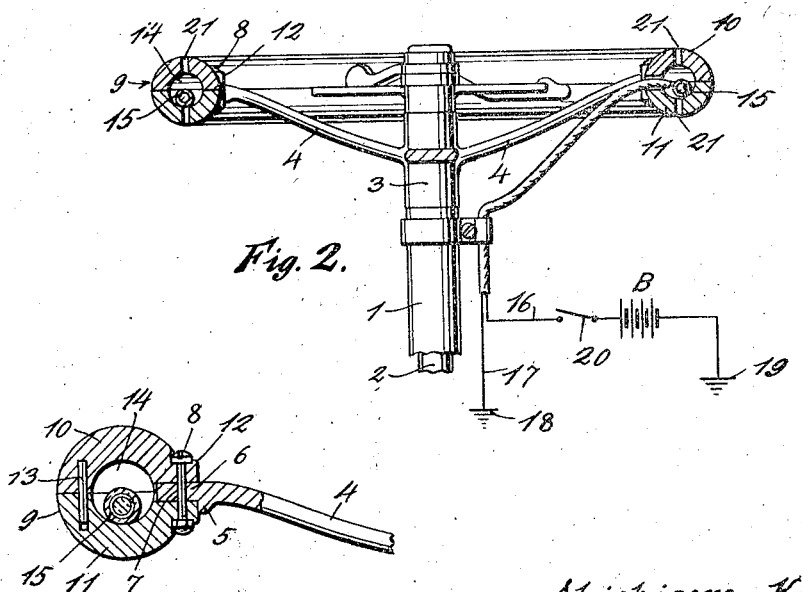
Fig. 2.
Fig. 3.
Inventor
Shichigoro Kuno.
By A. J. O'Brien
Attorney Patented Jan. 25, 1927.

1,615,635

UNITED STATES PATENT OFFICE.

SHICHIGORO KUNO, OF OGDEN, UTAH.

HEATING STEERING WHEEL.

Application filed May 17, 1926. Serial No. 109,511.

This invention relates to improvements in steering wheels for automotive vehicles, and has reference more particularly to a wheel provided with means for heating the same.

It is well known to all who drive automobiles, trucks, motor boats, aeroplanes or other automotive vehicles that it is exceedingly difficult for the driver to keep his hands from becoming cold during periods of low temperature. Even where fur gloves or mittens are employed, it often happens that the operator's hands become numb with cold because in order to properly guide the vehicle the hands must be continually held in place on the steering wheel, which prevents the blood from circulating as rapidly as it would if the hands and arms were in motion. Aviators who are obliged to fly at high altitudes and encounter very low temperatures even on the hottest summer days, and as it is impossible for them to let go of the steering wheel, they are often subjected to annoyance and suffering by the fact that their hands become numbed by cold.

Nearly every automotive vehicle of today is provided with an electric generator for the purpose of supplying current for ignition and lighting and it is the object of this invention to produce a wheel that shall be so constructed that current from the generator may be employed for the purpose of generating heat that will keep the rim of the wheel warm and thereby serve to warm the hands of the operator.

It is well known that an electric current flowing through a resistance wire produces heat, which is proportional to the product of the resistance and the square of the current. This is taken advantage of in the conversion of electric energy into heat and electric current is frequently used for the production of heat for any purpose.

My invention briefly described consists in making the steering wheel with a hollow rim within which an electric heating element is placed. This heating element is connected to the ignition battery of the vehicle by means of suitable conductors which are controlled by a switch so that the current may be passed through the resistance whenever it is desired to generate heat within the rim of the steering wheel. By this means the rim of the steering wheel can be maintained at any desired temperature regardless of the temperature of the circumambient air.

For the purpose of more clearly describing my invention and the manner of using the same, reference will be had to the accompanying drawing in which the preferred embodiment thereof has been illustrated and in which:

Figure 1 is a plan view of a steering wheel constructed in accordance with my invention, a portion being broken away to better show the construction;

Figure 2 is a section taken on line 2—2, Figure 1; and

Figure 3 is a section taken on line 3—3, Figure 1.

Referring now to the drawing, numeral 1 represents the tubular portion of the steering post through which the rotatable steering rod 2 extends. Secured to the upper end of the steering rod is the hub 3 of the steering wheel. Extending radially from the hub are spokes 4, which are preferably curved upwardly in the manner indicated in Figure 2. From Figure 3, it will be seen that the outer ends of the spokes 4 are provided on their lower surface with a shoulder 5, which is spaced a short distance from the extreme outer ends. The end portion 6 is provided with an opening 7 for the reception of a clamping bolt 8. The rim which I have indicated as a whole by numeral 9 is formed of two parts 10 and 11, of which part 10 is located on the upper and part 11 on the lower side of the end portions 6. Parts 10 and 11 have inwardly projecting lugs 12 directly over the ends of the spokes 4 so as to provide a convenient place for the bolts 7. In order to facilitate the assembly of the rims I have provided the two parts 10 and 11 with registering openings which are adapted to receive the dowel pins 13 (Figure 3). It will be noted from Figures 2 and 3 that the parts 10 and 11 have their adjacent faces hollowed out so that when they are assembled an annular opening of circular cross section is provided. This opening has been indicated by numeral 14. Located within the opening 14 is a resistance 15, which may be formed of any suitable resistance wire. The ends of this resistance are connected to the conductors 16 and 17 in the manner indicated in Figure 1. The wire 16 extends to the ungrounded pole of the battery B. While the wire 17 is grounded to some part of the machine in the manner indicated by numeral 18, the other pole of battery B is grounded to the frame at 19. A switch 20 serves to open and close the circuit through wire 16.

It will be apparent from the above drawing and description that when switch 20 is closed, current will flow through the wire 16 and through the resistance 15, thence through wire 16 and through the ground and to the other pole of the battery. The resistance of the resistant element 15 is so calculated that at the voltage available the desired amount of heat is generated by the resistance element. Since the resistance element is located within the rim of the wheel, the heat generated thereby will serve to heat the rim 9 which in turn will transmit heat to the hands of the operator. Whenever necessary holes 21 may be provided in the parts 10 and 11 so as to provide a path through which air may flow, although this is not considered necessary as the heat generated by the heating element will in any event be transmitted to the rim 9.

From the above it will be apparent that an automotive vehicle provided with my improved steering wheel can be safely driven during low temperatures because the steering wheel can be maintained as warm as may be desired at all times, thereby eliminating all dangers due to the numbness of the operator's hands.

Having now described my invention what I claim as new is:

A steering wheel having a hub provided with a plurality of spokes extending radially from said hub, each of said spokes having its end flattened and provided with a perforation for the reception of a clamping bolt, a two-part hollow circular rim secured to said spokes, each part of said rim being substantially the same size and shape as the other, and having a semi-circular cross section whose flat diametrical surface is adapted to fit against the corresponding flat surface of the other part so as to form a rim having a circular cross section, each of said sections having a semicircular channel in the face adjacent the other section whereby a circular groove is formed for the reception of an electric heater, each section having an inward projection provided with a notch which cooperates with a corresponding notch in the other section to form an opening for the reception of the end of a spoke, said projection being provided with perforations for the reception of a clamping bolt and a clamping bolt for securing the rim to each of said spokes.

In testimony whereof I affix my signature.

SHICHIGORO KUNO.